(12) United States Patent
Acedo et al.

(10) Patent No.: US 9,823,848 B2
(45) Date of Patent: *Nov. 21, 2017

(54) ESTABLISHING A LOGICAL CONFIGURATION FOR A DATA STORAGE LIBRARY

(71) Applicant: INTERNATIONAL BUSINESS MACHINES CORPORATION, Armonk, NY (US)

(72) Inventors: Mario F. Acedo, Tucson, AZ (US); Ezequiel Cervantes, San Jose, CA (US); Paul A. Jennas, II, Tucson, AZ (US); Jason L. Peipelman, Austin, TX (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,925

(22) Filed: Apr. 24, 2017

(65) Prior Publication Data

US 2017/0228165 A1     Aug. 10, 2017

Related U.S. Application Data

(63) Continuation of application No. 12/058,131, filed on Mar. 28, 2008, now Pat. No. 9,632,728.

(51) Int. Cl.
 G06F 12/02     (2006.01)
 G06F 3/06     (2006.01)
 G06F 12/0802     (2016.01)

(52) U.S. Cl.
 CPC .......... *G06F 3/0607* (2013.01); *G06F 3/067* (2013.01); *G06F 3/0629* (2013.01); *G06F 3/0659* (2013.01); *G06F 3/0667* (2013.01); *G06F 12/0802* (2013.01); *G06F 2212/60* (2013.01)

(58) Field of Classification Search
 None
 See application file for complete search history.

(56) References Cited

U.S. PATENT DOCUMENTS 6,604,165 B1   8/2003  Terao
7,653,792 B2   1/2010  Shimada et al.
7,962,776 B2   6/2011  Groff et al.
       (Continued)

FOREIGN PATENT DOCUMENTS

EP        1100010 A2    5/2001

*Primary Examiner* — Charles Rones
*Assistant Examiner* — Ryan Dare
(74) *Attorney, Agent, or Firm* — Griffiths & Seaton PLLC

(57) ABSTRACT

A system to configure a storage library, by a processor. A first storage library comprising a plurality of host adapters, a data cache, and a plurality of device adapters is supplied. The first storage library is in communication via fiber channel with a storage area network comprising a storage virtual controller, and the storage area network comprises a configuration library. The storage area network is in communication with a host computer comprising a command line interface and an application. The host adapter, data cache, and device adapter is logically configured using a plurality of logical configuration commands created using the host computer and the command line interface. The plurality of logical configuration commands are added to the configuration library and saved for later use.

14 Claims, 5 Drawing Sheets

(56) References Cited

U.S. PATENT DOCUMENTS

| | | |
|---|---|---|
| 8,307,359 B1 | 11/2012 | Brown et al. |
| 2006/0036736 A1 | 2/2006 | Kitamura et al. |
| 2007/0038747 A1 | 2/2007 | Kishimoto et al. |
| 2009/0248905 A1 | 10/2009 | Kishimoto et al. |
| 2010/0082933 A1 | 4/2010 | Fleming et al. |

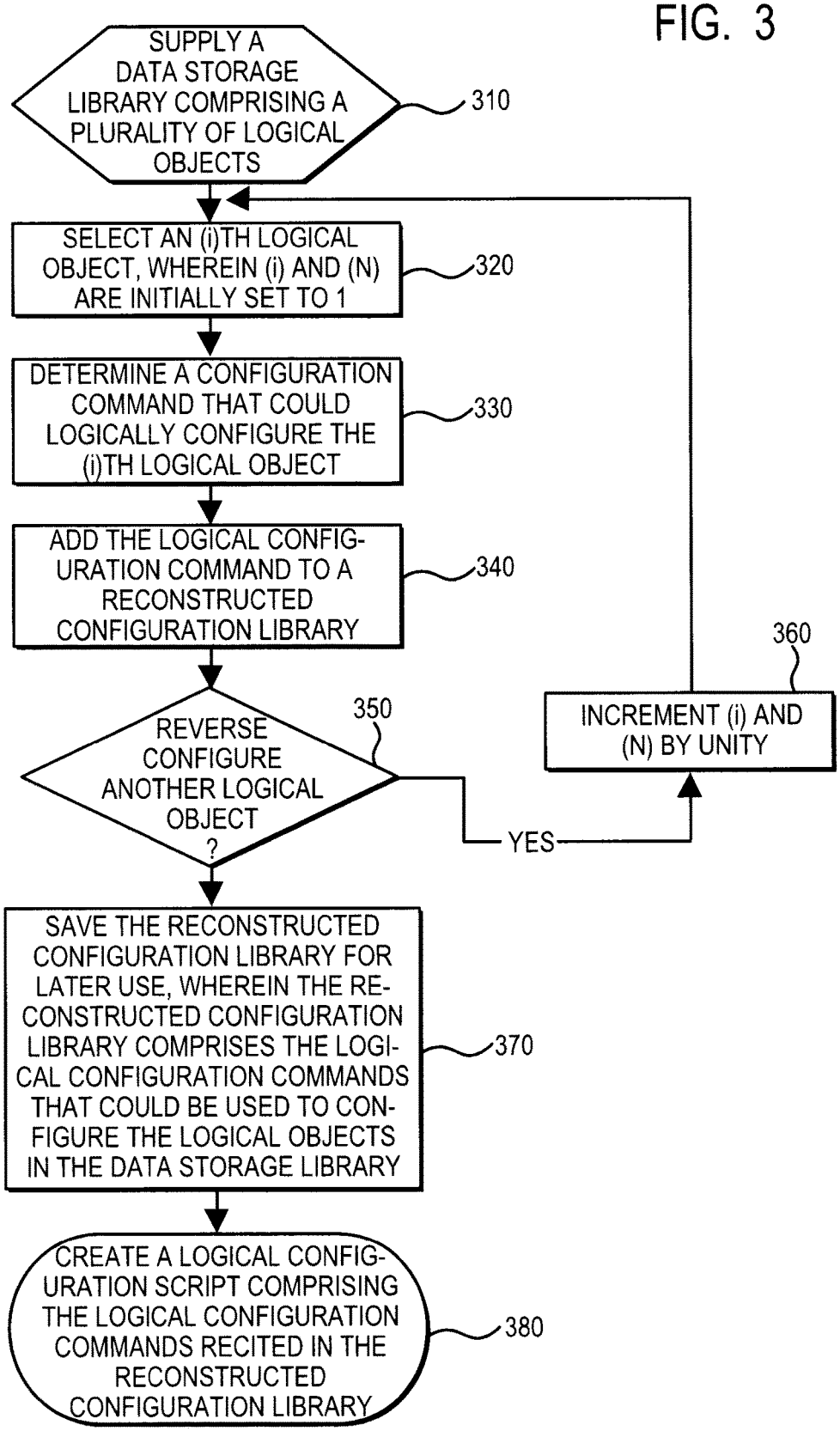

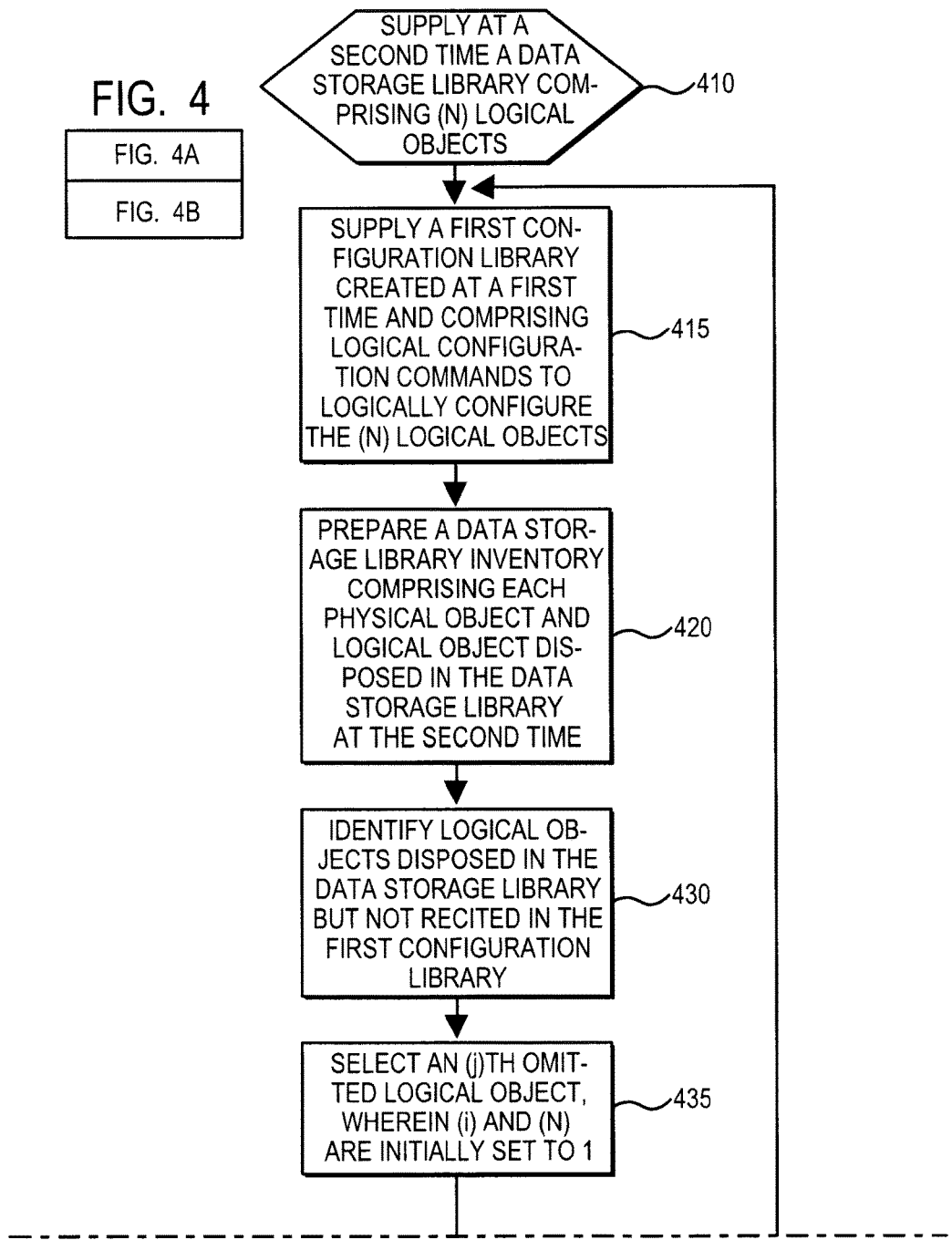

ESTABLISHING A LOGICAL CONFIGURATION FOR A DATA STORAGE LIBRARY

CROSS-REFERENCE TO RELATED APPLICATIONS

This Application is a Continuation of U.S. patent application Ser. No. 12/058,131, filed on Mar. 28, 2008.

FIELD OF THE INVENTION

This invention relates to an apparatus and method to establish a logical configuration for a data storage library.

BACKGROUND OF THE INVENTION

Computing systems generate information. It is known in the art to store such information using a data storage library comprising a plurality of physical objects, such as for example a plurality of host adapters, a plurality of processors, a plurality of device adapters, a plurality of storage media, a plurality of robotic accessors, and the like. The individual physical objects disposed in such data storage libraries are often logically configured to comprise one or more logical objects, one or more logical subsystems, one or more logical volumes, one or more logical units, and the like.

Creating such a logical configuration can be a time-consuming task. Often, creating such a logical configuration is performed by a computing system architect using a plurality of specific logical configuration commands.

SUMMARY OF THE INVENTION

Applicants' invention includes various embodiments to configure a storage library. In one embodiment, a method supplies a first storage library comprising a plurality of physical objects, establishes a logical configuration for the storage library, and configures a plurality of logical objects using a plurality of logical configuration commands, and adds the plurality of logical objects to the logical configuration. The method further adds that plurality of logical configuration commands to a configuration library, and saves that configuration library for later use.

In certain embodiments, Applicants' invention further creates a configuration script comprising the logical configuration commands recited in the configuration library. That configuration script can be used to subsequently re-establish the logical configuration for the storage library, or to utilize that logical configuration for a different storage library.

In certain embodiments, Applicants' invention further includes a method to "reengineer" a plurality of logical configuration commands that could have been used to create a pre-existing logical configuration, and saves those logical configuration commands in a reconstructed configuration library. In certain embodiments, Applicants' invention further creates a reconstructed configuration script comprising the logical configuration commands recited in the reconstructed configuration library. That reconstructed configuration script can be used to subsequently re-establish the logical configuration for the storage library, or to utilize that logical configuration for a different storage library.

In certain embodiments, Applicants' invention further includes a method to update an earlier configuration library by identifying a plurality of logical objects that are omitted from that earlier configuration library, and creating omitted logical configuration commands that could have been used to logical configure the omitted logical objects, and adding those omitted logical configuration commands to the earlier configuration library to form an updated configuration library. In certain embodiments, Applicants' invention further creates an updated configuration script comprising the logical configuration commands recited in the updated configuration library. That updated configuration script can be used to subsequently re-establish the logical configuration for the storage library, or to utilize that logical configuration for a different storage library.

BRIEF DESCRIPTION OF THE DRAWINGS

The invention will be better understood from a reading of the following detailed description taken in conjunction with the drawings in which like reference designators are used to designate like elements, and in which:

FIG. 3 is a flow chart summarizing the steps of Applicants' method to form a reconstructed configuration library and a reconstructed configuration script;

FIG. 4A is a flow chart summarizing the steps of Applicants' method to form an updated configuration library and an updated configuration script.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
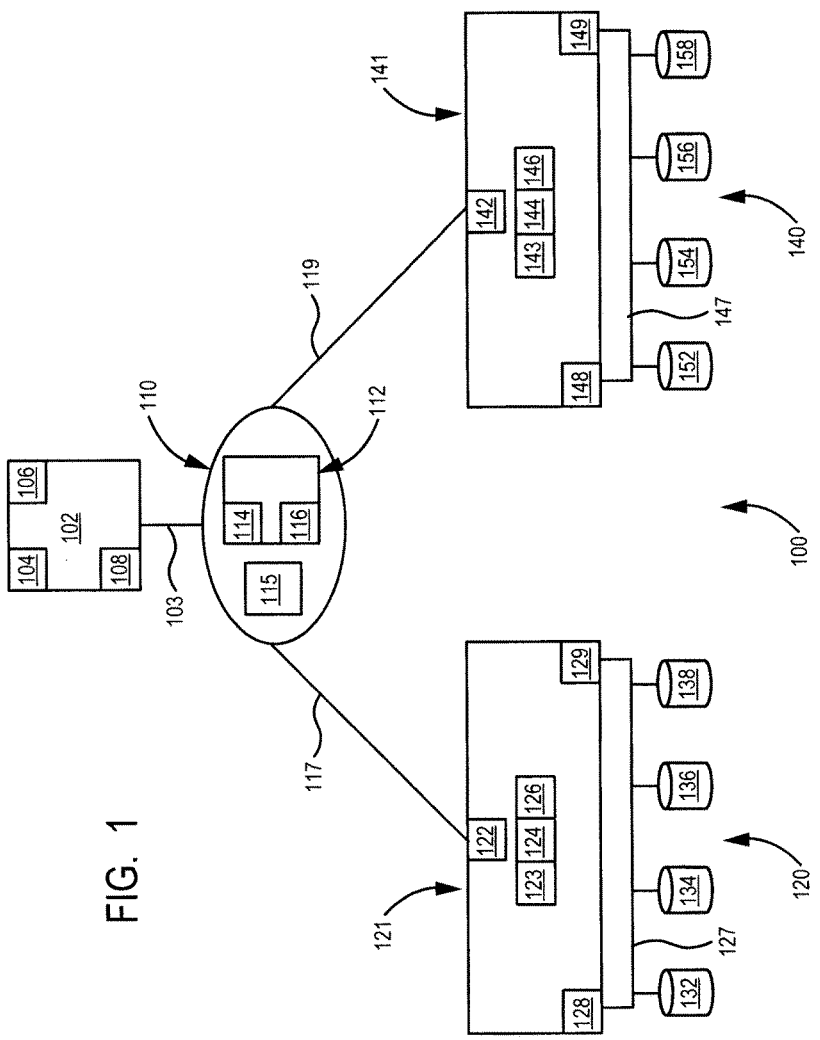
FIG. 1 is a block diagram showing one embodiment of Applicants' data storage system.

In the illustrated embodiment of FIG. 1, data storage system 100 comprises data storage library 120 and data storage library 140. Data storage library 120 comprises storage controller 121, data storage media 132, 134, 136, and 138 in communication with storage controller 121. Data storage library 140 comprises storage controller 141, and data storage media 152, 154, 156, and 158 in communication with storage controller 141. In certain embodiments, storage controller 121 communicates with data storage media 132, 134, 136, and 138, using any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA). In certain embodiments, storage controller 141 communicates with data storage media 152, 154, 156, and 158, using any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

By "data storage media," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, Applicants' storage controller 121 and data storage controller 141 are in communication with host computer 102. In other embodiments, storage controller 121, and/or storage controller 141, are in communication with a plurality of host computers.

As a general matter, host computer 102 comprises a computer system, such as a mainframe, personal computer, workstation, and combinations thereof. As those skilled in the art will appreciate, host computer 102 comprises additional hardware, firmware, and software not shown in FIG. 1, including but not limited to an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 102 further comprises a storage management program. In certain embodiments, that storage management program may include the functionality of storage management type programs known in the art that manage the transfer of data to and from a storage controller 120 and/or storage controller 140, such as for example and without limitation the IBM DFSMS implemented in the IBM MVS operating system.

In the illustrated embodiment of FIG. 1, host computer 102 is connected to storage area network ("SAN") 110 utilizing I/O protocol 103. I/O protocol 103 may be any type of I/O protocol, for example, a Fibre Channel ("FC") loop, a direct attachment to SAN 110 or one or more signal lines used by host computer 102 to transfer information to and from SAN 110.

In certain embodiments, SAN 110 includes, for example, one or more FC switches 115. In certain embodiments, those one or more switches 115 comprise one or more conventional router switches. In the illustrated embodiment of FIG. 1, one or more switches 115 interconnect host computer 102 to storage controller 120 via I/O protocol 117, and to storage controller 140 via I/O protocol 119. I/O protocols 117 and 119 may comprise any type of I/O interface, for example, a Fibre Channel, Infiniband, Gigabit Ethernet, Ethernet, TCP/IP, iSCSI, SCSI I/O interface or one or more signal lines used by FC switch 115 to transfer information through to and from storage controllers 120 and/or 140, and subsequently to and from one or more of data storage media 132, 134, 136, 138, 152, 154, 156, and/or 158.

In the illustrated embodiment of FIG. 1, Applicants' storage controller 121 comprises host adapter 122, processor 123, instructions 124, data cache, 126, device adapters 128 and 129, and I/O protocol 127. In other embodiments, storage controller 120 comprises a plurality of host adapters, and more than two device adapters. Processor 123 communicates with data storage media 132, 134, 136, and 138, utilizing device adapters 128 and 129 and I/O protocol 127. In certain embodiments, I/O protocol 127 comprises a fibre channel arbitrated ("FC-AL") loop. In other embodiments, I/O protocol 127 comprises other network topologies and devices, including without limitation SAS devices and/or SATA devices.

In the illustrated embodiment of FIG. 1, Applicants' storage controller 141 comprises host adapter 142, processor 143, instructions 144, data cache 146, device adapters 148 and 149. In other embodiments, storage controller 141 comprises a plurality of host adapters, and more than two device adapters. Processor 143 communicates with data storage media 152, 154, 156, and 158, utilizing device adapters 148 and 149 and I/O protocol 147. In certain embodiments, I/O protocol 147 comprises a fibre channel arbitrated ("FC-AL") loop. In other embodiments, I/O protocol 147 comprises other network topologies and devices, including without limitation SAS devices and/or SATA devices.

Data storage library 120 comprises a logical configuration, whereunder various physical devices disposed in the data storage library 120 are configured as one or more logical objects, logical subsystems, logical unit numbers, and/or logical volumes. Typically, a storage system architect will create such a logical configuration using, for example, a command line interface ("CLI") 104 in combination with a plurality of configuration commands.

As those skilled in the art will appreciate, unlike a button or menu item in a graphical user interface, a command line is typically self-documenting, stating exactly what the user wants done. A CLI can generally be considered as consisting of syntax and semantics. The syntax is the grammar that all commands must follow. In the case of operating systems (OS), MS-DOS and UNIX each define their own set of rules that all commands must follow. In the case of embedded systems, each vendor, such as Nortel, Juniper Networks or Cisco Systems, defines their own proprietary set of rules that all commands within their CLI conform to. These rules also dictate how a user navigates through the system of commands. The semantics define what sort of operations are possible, and on what sort of data these operations can be performed.

A simple CLI will display a prompt, accept a "command line" typed by the user terminated by the Enter key, then execute the specified command and provide textual display of results or error messages. Advanced CLIs will validate, interpret and parameter-expand the command line before executing the specified command, and optionally capture or redirect its output.

Useful command lines can be saved by assigning a character string or alias to represent the full logical configuration command, or several logical configuration commands can be grouped to perform a more complex sequence, thereby creating a single entity, called a command procedure or script which itself can be treated as a command.

Applicants' invention comprises a method to establish a logical configuration for a data storage library, such as for example data storage library 120 (FIG. 1), wherein that method generates a plurality of logical configuration commands, establishes and saves a configuration library comprising each of the plurality of logical configuration commands, and defines a logical configuration script comprising the configuration commands written to the configuration library.

Figure 2:
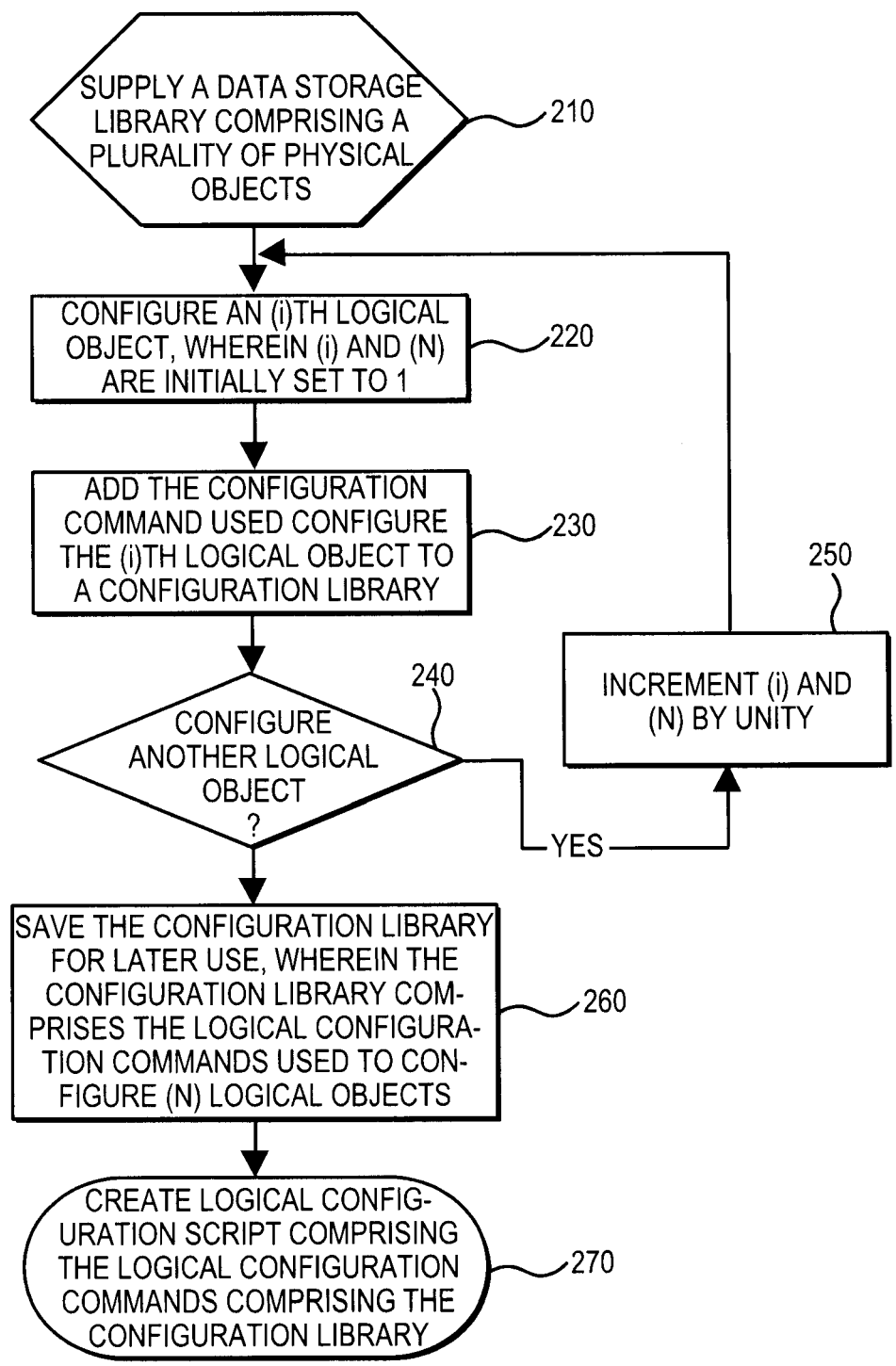
FIG. 2 is a flow chart summarizing the steps of Applicants' method to form a configuration library and a configuration script.

Referring now to FIG. 2, in step 210 the method supplies a data storage system, such as for example and without limitation data storage system 120 (FIG. 1) and/or 140 (FIG. 1), comprising a plurality of physical objects. In step 220, the method configures an (i)th logical object, wherein (i) and (N) are initially set to 1. In certain embodiments, the (i)th logical object of step 220 comprises a physical object. In certain embodiments, the (i)th logical object of step 220 comprises a logical subsystem comprising a plurality of physical objects. In certain embodiments, the (i)th logical object of step 220 comprises a virtual object.

In certain embodiments, step 220 is performed by a system architect using a command line interface, such as CLI 104 (FIG. 1), in combination with one or more configuration commands. In certain embodiments, the CLI of step of step 220 is encoded using an application 106 residing on a host computer, such as host computer 102 (FIG. 1), wherein that host computer is in communication with the data storage library of step 210.

In step 230, the method creates and maintains a configuration library for the data storage library of step 210. Further in step 230, the method saves in the configuration library the one or more logical configuration commands used in step 220 to logically configure the (i)th logical object. In certain embodiments, step 230 further comprises adding to the configuration library the one or more physical objects logically configured to comprise the (i)th logical object of step 220.

In step 240, the method determines whether to configure another logical object. If the method elects to configure another logical object, then the method transitions from step 240 to step 250 wherein the method increments (i) and (N) by unity. The method transitions from step 250 to step 220 and continues as described herein. Alternatively, if the method elects in step 240 not to configure another logical object, then the method transitions from step 240 to step 260 wherein the method saves the configuration library comprising the logical configuration commands used to configure (N) logical objects. In certain embodiments, the configuration library of saved in step 260 further recites one or more physical objects configured to comprise one or more of the (N) logical objects. In certain embodiments, the configuration library of saved in step 260 further recites one or more virtual objects configured to comprise one or more of the (N) logical objects.

In the illustrated embodiment of FIG. 1, SAN 110 comprises storage virtual controller ("SVC") 112. Further in the illustrated embodiment of FIG. 1, SVC 112 comprises configuration library 114. In other embodiments, SVC 112 may reside in a storage controller, such as storage controller 121, disposed in a data storage library, such as data storage library 120. In yet other embodiments, SVC 112 may reside in a host computer, such as host computer 102.

Referring once again to FIG. 2, in step 270 the method creates and saves a configuration script comprising the logical configuration commands used to configure (N) logical objects comprising the configuration library of step 260. In the illustrated embodiment of FIG. 1, SVC 112 comprises configuration script 116.

In the event the logical configuration created using the method of FIG. 2 needs to be re-established on the data storage library of step 210, the configuration script of step 270 can be used to create an identical logical configuration for that data storage library. Furthermore, the configuration script of step 270 can be used to create an identical logical configuration for a different data storage system, such as for data storage system 140 (FIG. 1).

Applicants' invention further comprises a method to "reengineer" a previously established logical configuration for a data storage library. Referring now to FIG. 3, in step 310 the method supplies a data storage system, such as for example and without limitation data storage system 120 (FIG. 1) and/or 140 (FIG. 1), comprising a plurality of previously defined logical objects. In step 320, the method selects an (i)th logical object, wherein (i) and (N) are initially set to 1. In certain embodiments, the (i)th logical object of step 320 comprises an (i)th physical object. In certain embodiments, the (i)th logical object of step 320 comprises an (i)th virtual object. In certain embodiments, the (i)th logical object of step 320 comprises a logical subsystem comprising a plurality of physical objects. In certain embodiments, the (i)th logical object of step 320 comprises a virtual object.

In step 330, the method determines a configuration command that would configure the (i)th physical/virtual object as the (i)th logical object of step 320. In certain embodiments, step 330 is performed by a system architect. In certain embodiments, step 330 is performed by a host computer in communication with the data storage library of step 310. In certain embodiments, step 330 is performed by the data storage library of step 310.

In step 340, the method creates and maintains a reconstructed configuration library for the data storage library of step 310. Further in step 340, the method saves in the reconstructed configuration library the one or more logical configuration commands identified in step 330, wherein those logical configuration commands could logically configure the (i)th physical/virtual object as the (i)th logical object of step 320. In certain embodiments, step 340 further comprises adding to the reconstructed configuration library the one or more physical/virtual objects logically configured to comprise the (i)th logical object of step 320.

In step 350, the method determines whether to reengineer the logical commands used to logical configure another logical object. If the method elects to reengineer another logical object, then the method transitions from step 350 to step 360 wherein the method increments (i) and (N) by unity. The method transitions from step 360 to step 320 and continues as described herein.

Alternatively, if the method elects in step 350 not to reengineer another logical object, then the method transitions from step 350 to step 370 wherein the method saves the reconstructed configuration library comprising the logical configuration commands sequentially identified in step 330. In certain embodiments, the reconstructed configuration library saved in step 370 further recites one or more physical objects logically configured to comprise one or more of the logical objects comprising the logical configuration of step 310. In certain embodiments, the reconstructed configuration library saved in step 260 further recites one or more virtual objects logically configured to comprise one or more of the logical objects comprising the logical configuration of step 310. In step 380, the method creates and saves a reconstructed configuration script comprising the logical configuration commands recited in the reconstructed configuration library of step 370.

The reconstructed configuration script of step 380 can be used to recreate an identical logical configuration for the data storage library of step 310. Furthermore, the reconstructed configuration script of step 380 can be used to create an identical logical configuration for a different data storage system, such as for data storage system 140 (FIG. 1).

Applicants' invention further comprises a method to update a configuration library to add logical configuration commands recently used to logically configure additional logical objects, and to monitor use of the data storage library based upon those newly configured logical objects. Referring now to FIG. 4A, in step 410 the method at a second time supplies a data storage system, such as for example and without limitation data storage system 120 (FIG. 1) and/or 140 (FIG. 1), comprising a second logical configuration comprising a second plurality of logical objects.

In step 415, the method supplies a first configuration library created at a first time, wherein that first configuration library recites a first plurality of logical objects comprising a first logical configuration for the data storage library of step 410, wherein the first time precedes the second time.

In step 420, the method creates a storage library inventory comprising each physical object and logical object disposed in the storage library of step 410. In step 430, the method identifies logical objects recited in the inventory of step 420 but omitted from the first configuration library of step 415.

In step 435, the method selects an (i)th omitted logical object, wherein (i) is initially set to 1. In step 440, the method determines an omitted configuration command that could configure the (i)th omitted logical object of step 435. In certain embodiments, step 440 is performed by a system architect. In certain embodiments, step 440 is performed by a host computer in communication with the data storage library of step 310. In certain embodiments, step 440 is performed by the data storage library of step 310.

In step 445, the method creates and maintains an updated configuration library by adding to the first configuration library the one or more omitted (i)th configuration commands identified in step 440. In step 450, the method sets (N') equal to (N) plus (i).

In step 455, the method determines whether to reengineer the one or more logical commands used could be used to logical configure another omitted logical object. If the method elects to reengineer another omitted logical object, then the method transitions from step 455 to step 460 wherein the method increments (i) by unity. The method transitions from step 460 to step 415 and continues as described herein.

Alternatively, if the method elects in step 455 not to reengineer another omitted logical object, then the method transitions from step 455 to step 470 wherein the method saves the updated configuration library as supplemented one or more times in step 445. In step 480, the method evaluates and/or monitors the recent usage of the storage library of step 410 by analyzing the one or more omitted logical configuration commands of step 440, and the one or more physical objects and/or the zero or more virtual objects, that correspond to the one or more omitted logical configuration commands.

In step 490, the method creates and saves an updated configuration script comprising the logical configuration commands recited the updated configuration library saved in step 470. The updated configuration script of step 490 can be used to recreate an identical logical configuration for the data storage library of step 410. Furthermore, the updated configuration script of step 490 can be used to create an identical logical configuration for a different data storage system, such as for data storage system 140 (FIG. 1).

In certain embodiments, one or more of the steps recited in FIGS. 2, 3, and/or 4, may be may be combined, eliminated, or reordered.

Figure 4B:
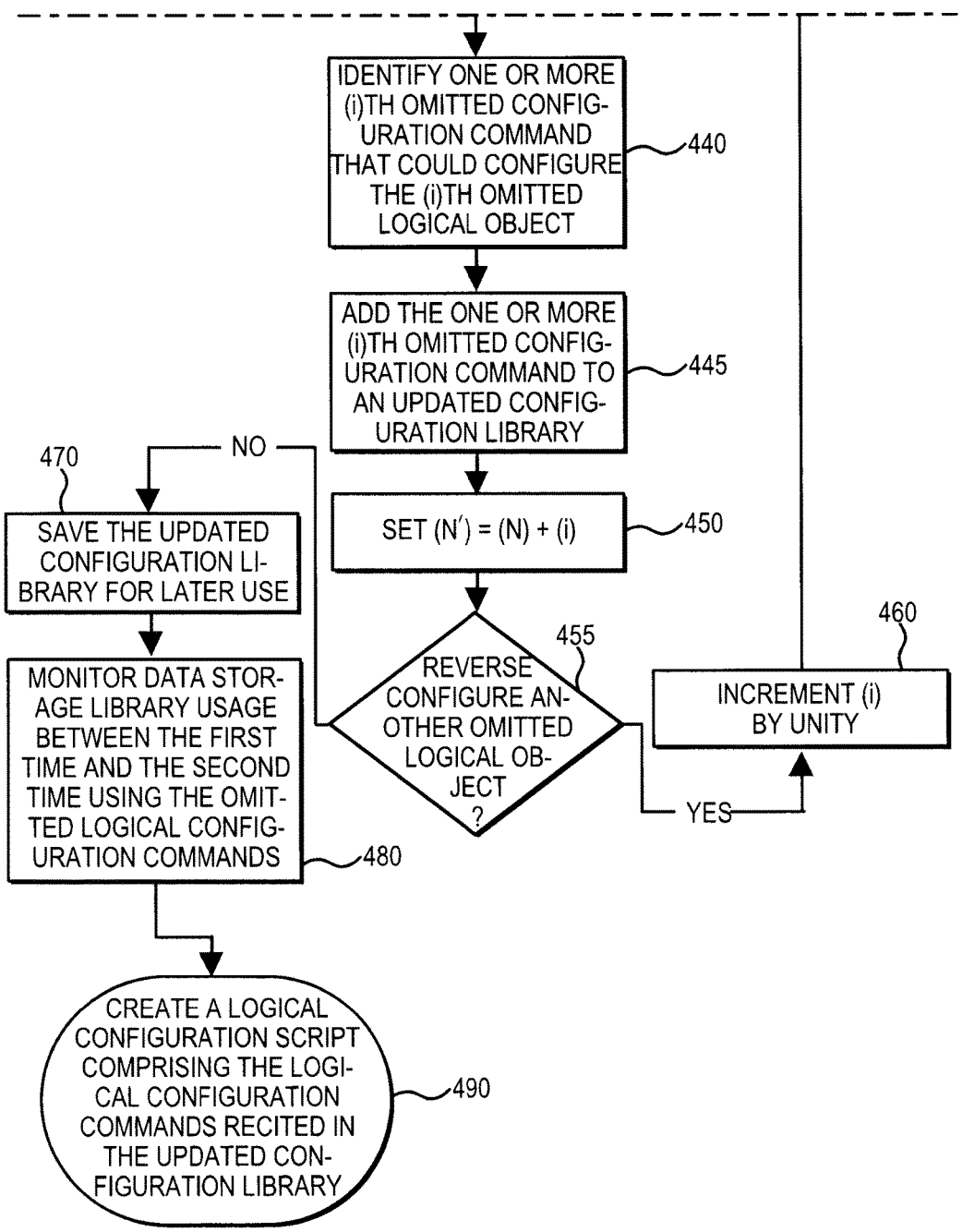
FIG. 4B is a flow chart summarizing additional steps of Applicants' method to form an updated configuration library and an updated configuration script

In certain embodiments, Applicants' invention includes instructions, such as instructions 108 (FIG. 1), where those instructions are encoded in a computer readable medium, and executed by a processor to perform one or more of steps 220, 230, 240, 250, 260, and/or 270, recited in FIG. 2, and/or one or more of steps 320, 330, 340, 350, 360, 370, and/or 380, recited in FIG. 3, and/or one or more of steps 420, 430, 435, 440, 445, 450, 455, 460, 470, 480, and/or 490, recited in FIGS. 4A and 4B.

In other embodiments, Applicants' invention includes instructions residing in any other computer program product encoded in a computer readable medium, where those instructions are executed by a computer external to, or internal to, system 100, to perform one or more of steps 220, 230, 240, 250, 260, and/or 270, recited in FIG. 2, and/or one or more of steps 320, 330, 340, 350, 360, 370, and/or 380, recited in FIG. 3, and/or one or more of steps 420, 430, 435, 440, 445, 450, 455, 460, 470, 480, and/or 490, recited in FIGS. 4A and 4B. In either case, the instructions may be encoded in an information storage medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

The present invention may be a system, a method, and/or a computer program product. The computer program product may include a computer readable storage medium (or media) having computer readable program instructions thereon for causing a processor to carry out aspects of the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. A system for configuring a storage library, the system comprising:
    a processor device executing instructions stored in a memory, wherein the processor device performs the steps of:
    supplying a first storage library comprising a plurality of host adapters, a data cache, and a plurality of device adapters, wherein said first storage library is in communication via fibre channel with a storage area network comprising a storage virtual controller, wherein said storage area network comprises a configuration library, wherein said storage area network is in communication with a host computer comprising a command line interface and an application;

logically configuring said host adapter, data cache, and device adapter using a plurality of logical configuration commands created using said host computer and said command line interface;

adding said plurality of logical configuration commands to said configuration library; and saving said configuration library for later use.

2. The system of claim 1, further comprising the step of adding to said configuration library one or more physical objects disposed in said storage library.

3. The system of claim 2, further comprising the steps of:

logically configuring one or more virtual objects as one or more logical objects using one or more logical configuration commands; and adding to said configuration library said one or more logical configuration commands used to logical configure said one or more virtual objects.

4. The system of claim 1, wherein said configuration library comprises (N) logical objects, and wherein said configuring step comprises using a command-line interface comprising an (i)th configuration command to configure an (i)th logical object, wherein (i) is greater than or equal to 1 and less than or equal to (N).

5. The system of claim 1, further comprising the step of forming a configuration script comprising said plurality of logical configuration commands.

6. The system of claim 5, further comprising the step of re-establishing said logical configuration for said first storage library using said configuration script.

7. The system of claim 5, further comprising the steps of:

supplying a second storage library comprising said plurality of host adapters, a data cache, and a plurality of device adapters physical objects; and establishing said logical configuration for said second storage library using said configuration script.

8. A computer program product for configuring a storage library, by a processor device, the computer program product embodied on a non-transitory computer-readable storage medium having computer-readable program code portions stored therein, the computer-readable program code portions comprising:

an executable portion that performs the steps of:

supplying a first storage library comprising a plurality of host adapters, a data cache, and a plurality of device adapters, wherein said first storage library is in communication via fibre channel with a storage area network comprising a storage virtual controller, wherein said storage area network comprises a configuration library, wherein said storage area network is in communication with a host computer comprising a command line interface and an application;

logically configuring said host adapter, data cache, and device adapter using a plurality of logical configuration commands created using said host computer and said command line interface;

adding said plurality of logical configuration commands to said configuration library; and saving said configuration library for later use.

9. The computer program product of claim 8, further comprising the step of adding to said configuration library one or more physical objects disposed in said storage library.

10. The system of claim 9, further comprising the steps of:

logically configuring one or more virtual objects as one or more logical objects using one or more logical configuration commands; and adding to said configuration library said one or more logical configuration commands used to logical configure said one or more virtual objects.

11. The computer program product of claim 8, wherein said configuration library comprises (N) logical objects, and wherein said configuring step comprises using a command-line interface comprising an (i)th configuration command to configure an (i)th logical object, wherein (i) is greater than or equal to 1 and less than or equal to (N).

12. The computer program product of claim 8, further comprising the step of forming a configuration script comprising said plurality of logical configuration commands.

13. The computer program product of claim 12, further comprising the step of re-establishing said logical configuration for said first storage library using said configuration script.

14. The computer program product of claim 12, further comprising the steps of:

supplying a second storage library comprising said plurality of host adapters, a data cache, and a plurality of device adapters physical objects; and establishing said logical configuration for said second storage library using said configuration script.

* * * * *